(12) United States Patent
Doebertin et al.

(10) Patent No.: US 7,780,114 B2
(45) Date of Patent: Aug. 24, 2010

(54) MODULAR GALLEY, IN PARTICULAR FOR AN AIRCRAFT

(75) Inventors: Oliver Doebertin, Hamburg (DE); Alexander Niesigk, Voesendorf (AT); Patrique Doemeland, Stegen (DE); Marc Velten, Constance (DE)

(73) Assignee: Airbus Deutschland GmbH (DE)

( * ) Notice: Subject to any disclaimer, the term of this patent is extended or adjusted under 35 U.S.C. 154(b) by 452 days.

(21) Appl. No.: 11/804,313

(22) Filed: May 17, 2007

(65) Prior Publication Data
US 2008/0001031 A1 Jan. 3, 2008

(30) Foreign Application Priority Data
May 17, 2006 (DE) .................. 10 2006 023 047

(51) Int. Cl.
*B64D 13/00* (2006.01)
(52) U.S. Cl. .................................. 244/118.5
(58) Field of Classification Search .............. 244/118.5, 244/118.1; 414/679, 236, 237; 187/251, 187/254, 256; 105/327; 312/122, 132, 301, 312/330.1
See application file for complete search history.

(56) References Cited

U.S. PATENT DOCUMENTS 2,724,629 A * 11/1955 Atchison ................ 312/274
2,994,760 A * 8/1961 Pecoraro et al. ........... 219/394
3,332,730 A * 7/1967 Rubin et al. ............. 312/330.1
3,788,717 A * 1/1974 Hosmer ................... 312/122
4,361,014 A * 11/1982 Blain ........................ 62/237
4,453,790 A * 6/1984 Cohen et al. ............. 312/334.7
5,322,244 A * 6/1994 Dallmann et al. ......... 244/118.5
6,612,116 B2 * 9/2003 Fu et al. ...................... 62/3.6
6,761,332 B1 * 7/2004 Bengtsson ............... 244/118.5
2001/0050519 A1 12/2001 Kasuya
2006/0060181 A1 3/2006 Sasaki et al.

FOREIGN PATENT DOCUMENTS

WO 2004/009444 1/2004
WO 2004/071867 8/2004

* cited by examiner

*Primary Examiner*—Tien Dinh
(74) *Attorney, Agent, or Firm*—Lerner, David, Littenberg, Krumholz & Mentlik, LLP

(57) ABSTRACT

A modular galley for an aircraft comprises several vertical and horizontal structural elements, and usage areas provided therebetween for accommodating slide-in devices, built-in devices or items of equipment. The galley comprises first structural elements that form an essentially unchangeable basic element which comprises connection elements for the mechanical connection of second structural elements, add-on devices, built-in devices, items of equipment and/or slide-in devices that are variable, and comprises interfaces for the supply to items of equipment that are provided in the galley wherein the connection elements and interfaces are standardized such that various structural elements, add-on devices, built-in devices, items of equipment and/or slide-in devices can be interchanged or can be affixed at various locations.

26 Claims, 17 Drawing Sheets

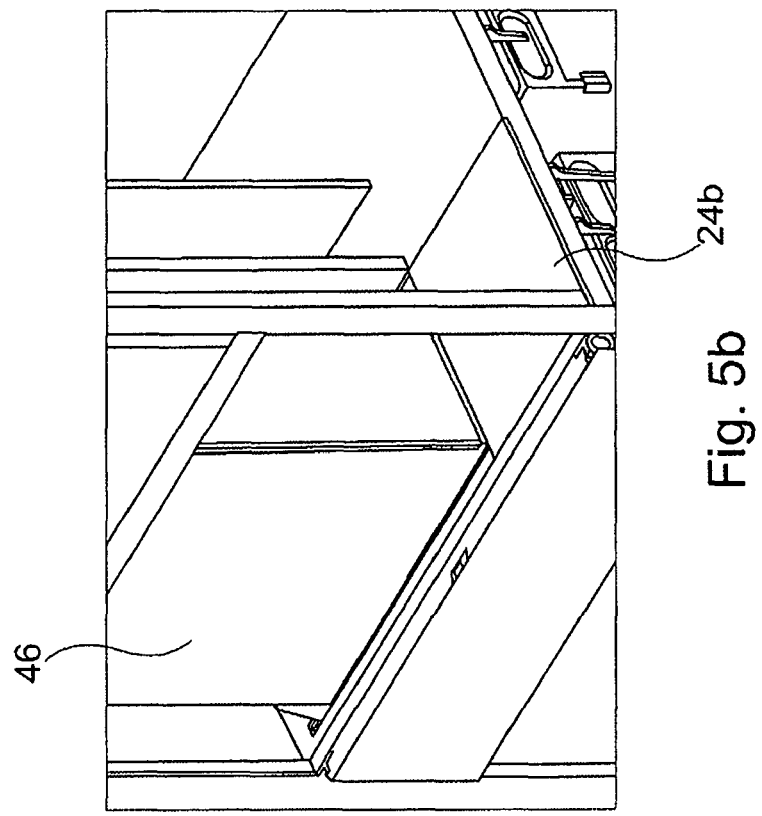
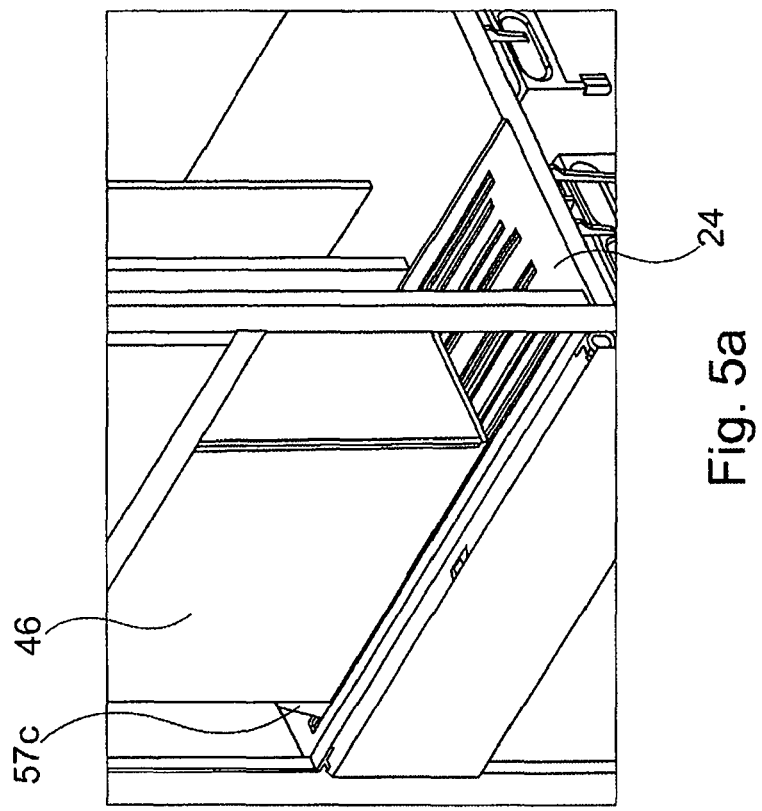

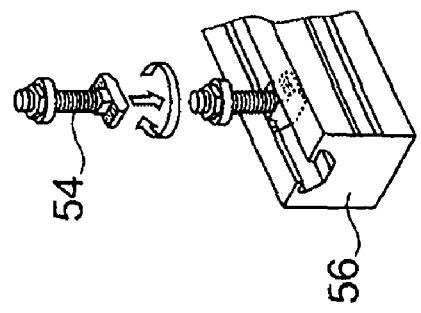
Fig. 8b Connecting element
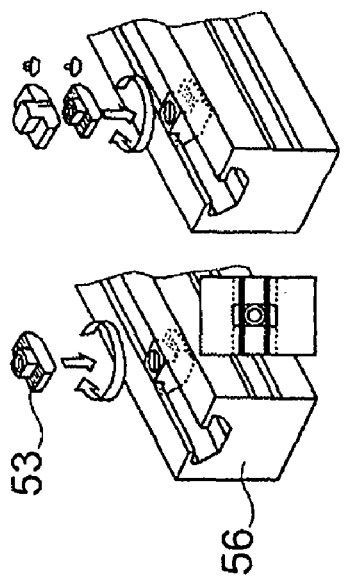
Fig. 8d Connecting element
Fig. 8a Rail cross section
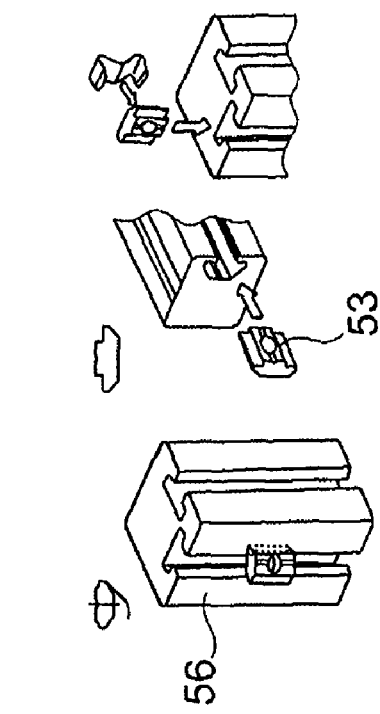
Fig. 8c Connecting element

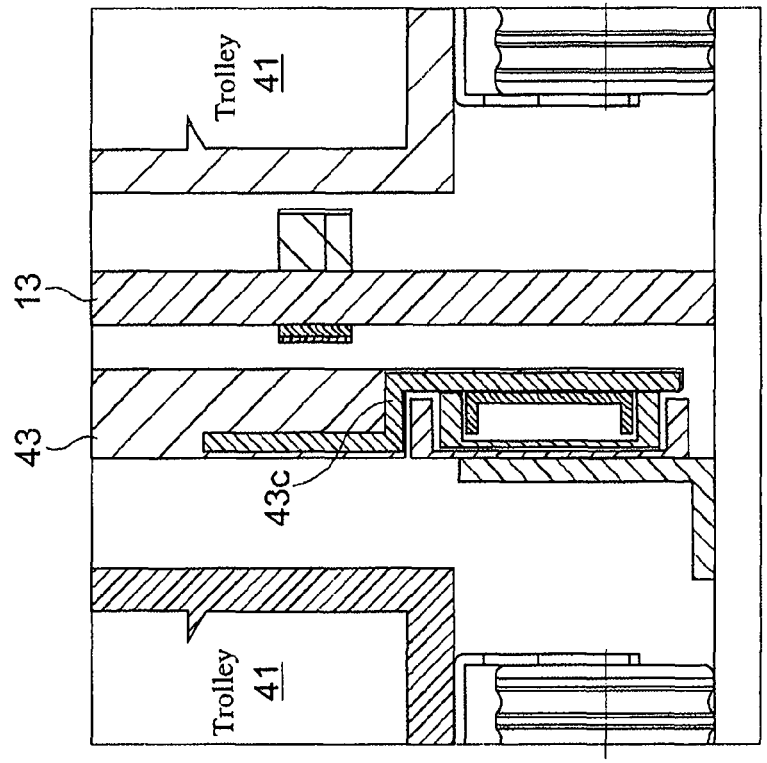
Fig. 12b  Section detail A
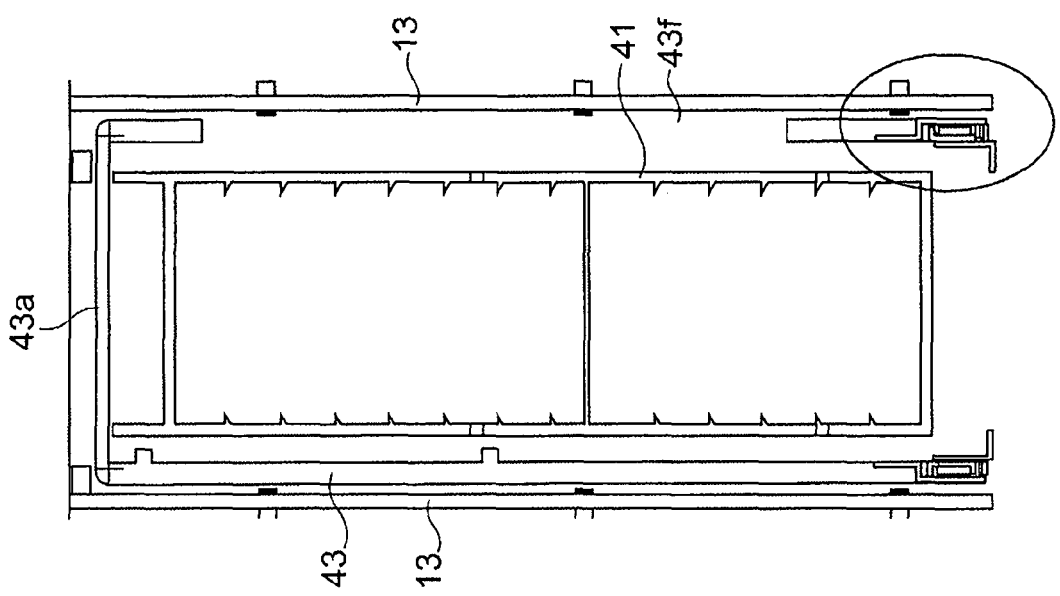
Fig. 12a  Detail A

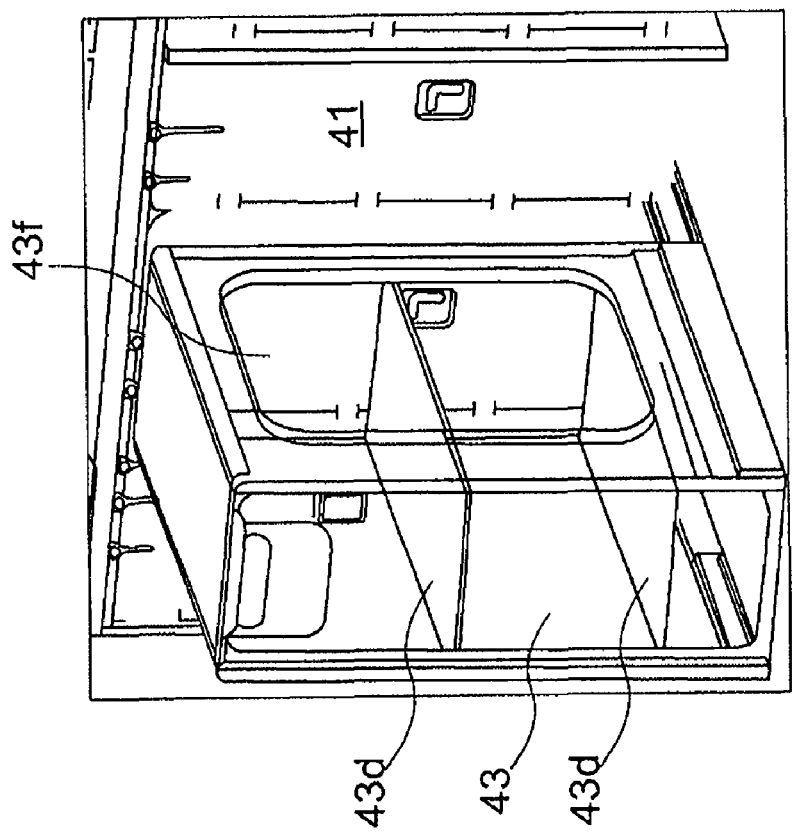
Fig. 15b Pulled-out U-module
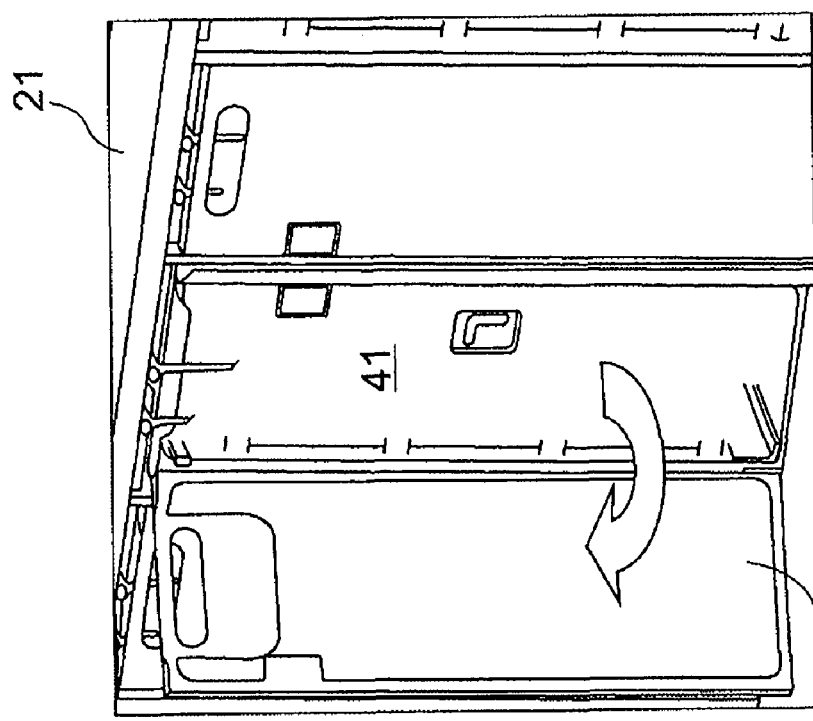
Fig. 15a Pull-out module - unrestricted access to the trolley Pulled-out U-module, locked Pulled-out U-module with folding surfaces Overall view of pull-out-module

MODULAR GALLEY, IN PARTICULAR FOR AN AIRCRAFT

CROSS-REFERENCE TO RELATED APPLICATIONS

This application claims the benefit of the filing date of German Patent Application No. 10 2006 023 047.7 filed May 17, 2006, the disclosure of which is hereby incorporated herein by reference.

BACKGROUND OF THE INVENTION

The invention relates to a modular galley, in particular for an aircraft, comprising several vertical structural elements and horizontal structural elements, and comprising usage areas provided between the vertical and horizontal structural elements, for accommodating slide-in devices or built-in devices or for some other use. Currently available galleys, so-called galley monuments, are specifically designed individual constructions that are produced with great effort and consequently at great expense, and which as far as their design is concerned have no variability or only slight variability. Adaptation to different user profiles and catering concepts (full service, self-service, etc.) is difficult or impossible.

SUMMARY OF THE INVENTION

It may be a need to create a galley that can be added to or converted in a simple manner.

This need may be met by a modular galley with the characteristics disclosed herein. Advantageous embodiments and improvements of the galley according to the invention are stated in the claims.

The invention relates to a modular galley, in particular for an aircraft, comprising several vertical structural elements and horizontal structural elements, and comprising usage areas provided between the vertical and horizontal structural elements, for accommodating slide-in devices, built-in devices, or items of equipment, or for some other use. The invention provides for the galley to comprise first structural elements that form an essentially unchanged basic element, and for the basic element to comprise connection elements for the mechanical connection of second structural elements, add-on devices, built-in devices, items of equipment and/or slide-in devices that are variable, and to comprise interfaces for the supply to devices that are provided in the galley, wherein the connection elements and interfaces are standardized such that various structural elements, add-on devices, built-in devices, items of equipment and/or slide-in devices can be interchanged or can be affixed at various locations.

According to an embodiment of the invention the structural elements comprise panel elements that delimit the usage areas.

According to an embodiment of the invention the interfaces for the supply to items of equipment provided in the galley comprise interfaces from the group of interfaces for supplying electricity, for supplying water, for disposing of waste water, and/or for transmitting data and information.

According to an embodiment of the invention the usage areas provided for accommodating slide-in devices or built-in devices or provided for some other use comprise a first type of usage area for standard usage that is closed on two sides that are opposite each other, and that for the purpose of accommodating slide-in devices or for some other use are accessible from a front that is arranged across the sides that are opposite each other, or in which slide-in devices, items of equipment or built-in devices that can be operated from the front are provided.

The usage areas provided for standard usage can be closed off, on the face opposite the front, by a rear panel.

The usage areas provided for standard usage can be open on the side opposite the front, and for the purpose of accommodating slide-in devices or for some other use can also be accessible from this side, or in said usage areas items of equipment or built-in devices can be provided that can also be operated from this side.

According to an embodiment of the invention the usage areas provided for accommodating slide-in devices and built-in devices, or for some other use, comprise at least one usage area that is provided for highly flexible use, which usage area is open at the front and at least at a second side that is arranged transverse to the front and which usage area comprises connection elements for the mechanical connection of built-in devices or items of equipment and interfaces for supplying devices with electricity or water or for transmitting data and information for various uses.

According to an embodiment of the invention the usage area provided for highly flexible use is arranged at one end or at both ends of the galley. Furthermore, the usage areas can also be designed in an L-shape or a U-shape and can extend e.g. along at least one corner section of the galley.

According to an embodiment of the invention the usage area provided for highly flexible use is open on three sides.

According to an embodiment of the invention the connection elements for the mechanical connection of built-in devices or items of equipment and the interfaces for supplying devices with electricity or water or for transmitting data and information or for some other supply or disposal are provided in a horizontal structural element that forms the bottom of the highly flexible usage area.

The mechanical connection elements can comprise attachment rails that extend parallel in the horizontal structural element that forms the bottom of the highly flexible usage area.

The attachment rails can comprise a C-shaped cross section that is open towards the top, and connecting elements that are insertable in the attachment rails and that are lockable can be provided, which connecting elements are slidable along the attachment rails and on which connecting elements built-in devices or items of equipment are to be attached at any desired position in relation to the longitudinal direction of the rails. Furthermore, T-shaped, L-shaped or U-shaped cross sections are of course also possible.

The connecting elements provided in the attachment rails can comprise internal screw threads that are used for screw fastening, or they can comprise threaded bolts with an external screw thread.

According to an embodiment of the invention the interfaces for supplying devices are standardized interfaces.

The standardized interfaces can comprise electrical ARINC interfaces.

According to an embodiment of the invention the interfaces are arranged between the attachment rails.

According to an embodiment of the invention, in the horizontal structural element, which forms the bottom of the usage area provided for highly flexible use, grooves or slits are provided which extend parallel to the rails, which grooves or slits are used to accommodate lines in an embedded manner, which lines lead from the interfaces to connections at the devices provided in the area for highly flexible use.

The add-on devices can comprise work surfaces or counter boards or extended-cover elements that have been affixed, by means of connection elements, to the outside of the basic element.

The add-on devices can comprise containers that have been rigidly or slidably affixed to the outside of the basic element.

The slide-in devices can comprise trolleys.

The slide-in devices can comprise bar- or storage elements that can be pulled out.

According to an embodiment of the invention the bar- or storage elements, which can be pulled out, can comprise an inverted U-shaped cross section, and are arranged so as to enclose one or several trolleys, wherein the long limbs of the "U"-shape form lateral parts which can be moved out and moved in laterally beside the trolleys relative to the basic body of the galley, and wherein the short limb of the "U"-shape forms a work surface.

The bar- or storage elements, which can be pulled out, can have a T-shaped or an inverted L-shaped cross section, wherein the long limb of the "T"-shape or of the "L"-shape forms a lateral part which can be moved out and moved in laterally beside the trolleys, wherein the short limb of the "T"-shape or of the "L"-shape forms a work surface.

According to an embodiment of the invention, on the bottom of the lateral parts of the bar- or storage elements, which can be pulled out, a pull-out mechanism is arranged which is essentially integrated within the width of the lateral parts.

According to an embodiment of the invention the bar- or storage elements, which can be pulled out, comprise intermediate bottoms, which in the moved-in state of the bar- or storage elements are vertically folded to the lateral parts, and in the moved-out state of the bar- or storage elements can be folded down horizontally.

Lastly, locking devices can be provided, by means of which the position of the slide-in devices in their moved-in state and in their moved-out state can be locked.

BRIEF DESCRIPTION OF THE DRAWINGS

Below, exemplary embodiments of the modular galley according to the invention are explained with reference to the drawings.

The following are shown:

FIGS. 5a) and b) again illustrations similar to those of FIG. 3, except in each case with one built-in device;

FIGS. 8a) to d) perspective views of connection elements that are provided for the mechanical connection of items of equipment or built-in devices, according to various exemplary embodiments of the invention;

FIGS. 12a) and b) as well as FIG. 13 further detail views of the slide-in devices or trolleys shown in FIG. 11a), according to this exemplary embodiment of the invention;

FIGS. 14, 15 and 16 further perspective views of the slide-in devices or trolleys, shown in FIG. 11a), to explain various details of said slide-in devices or trolleys.

DETAILED DESCRIPTION

Figure 1B:
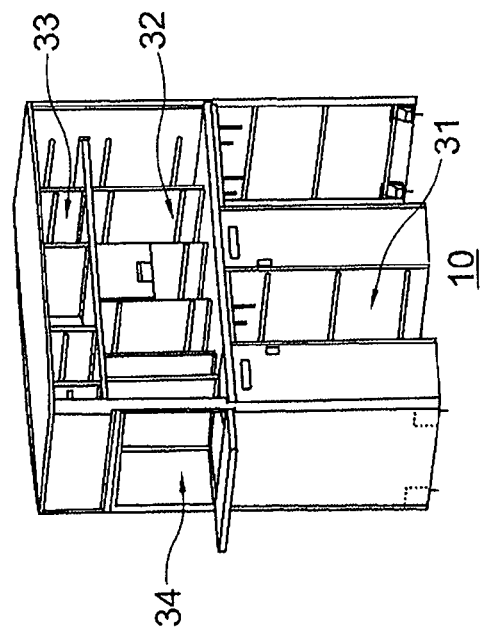
FIGS. 1a)-d) in each case a perspective view of a modular galley according to one exemplary embodiment of the invention, wherein a basic element of the modular galley is shown in four different outfit levels.
Figure 1D:
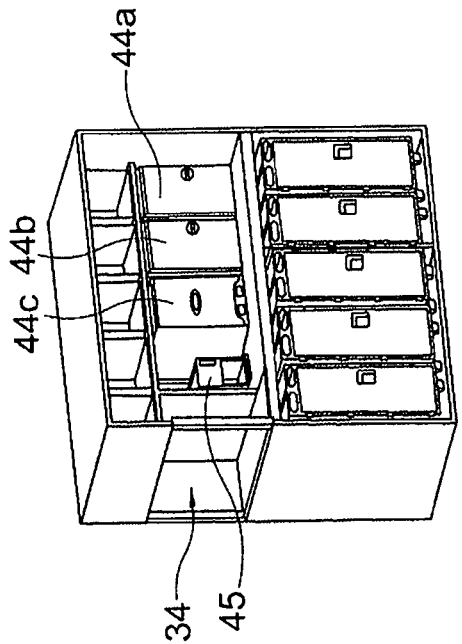
Figure 1A:
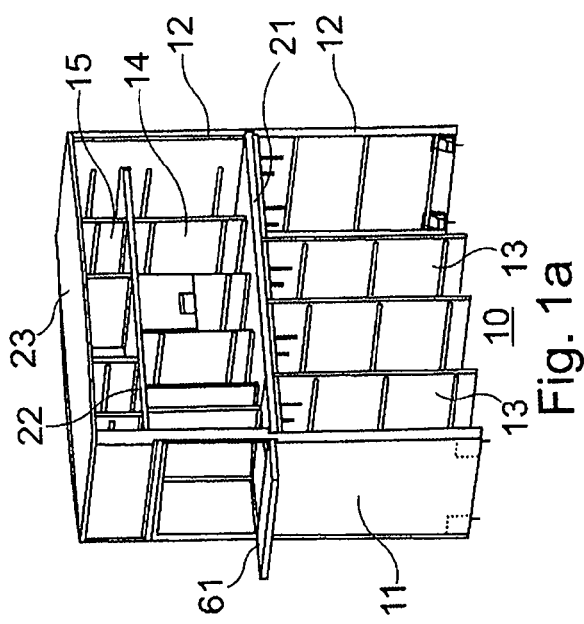
Figure 1C:
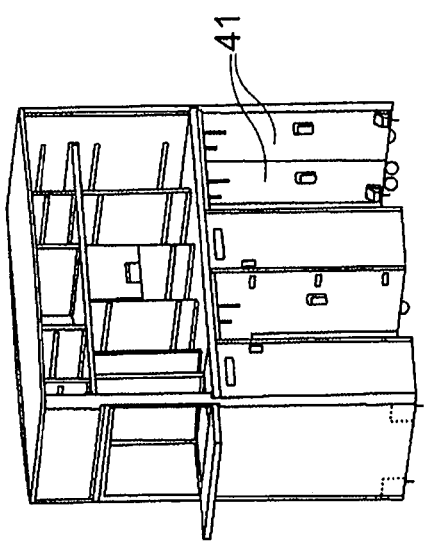

The modular galley shown in FIGS. 1 to 7 comprises a basic element 10 which is formed by a number of vertical structural elements 11, 12, 13, 14, 15 and horizontal structural elements 21, 22, 23. In the above illustrations, these structural elements 11, 12, 13, 14, 15, 21, 22, 23 are formed by respective vertical or horizontal panel elements, namely vertical lateral panels 11, 12, vertical intermediate panels 13, 14, 15, an intermediate bottom 21, a top cover 23 as well as a further intermediate bottom 22. As a result of the vertical and horizontal structural elements or panels 11, 12, 13, 14, 15, 21, 22, 23, a number of usage areas 31, 32, 33, 34 are formed or delimited, which are used to accommodate slide-in devices 41, 42, 43 or built-in devices or items of equipment 44a, 44b, 45, 46, 47, 48 or for any other use within the context of the use of a galley.

The structural elements 11, 12, 13, 14, 15, 21, 22, 23 form the basic element 10 in such a way that they are a component that is more or less fixed, which component in the context of normal use, e.g. on board an aircraft, is essentially not variable, and in this sense said structural elements 11, 12, 13, 14, 15, 21, 22, 23 are designated first structural elements. On the basic element 10, which is formed by these first structural elements 11, 12, 13, 14, 15, 21, 22, 23, a number of connection elements 51, 52, 53, 54, 55, 56 of a suitable type are provided, which are used to mechanically connect what in the present document are referred to as second structural elements, add-on devices 61, 62, 63, 64, built-in devices or items of equipment 44a, 44b, 45, 46, 47, 48 and/or slide-in devices 41, 42, 43, which, in contrast to the basic element 10, which is essentially considered as being unchangeable, are essentially to be considered as being variable in the sense of a modular design of the galley. These connection elements 51, 52, 53, 54, 55, 56, which are used to establish a mechanical connection of the aforesaid variable parts or components, are shown in more detail in FIGS. 4 and 8; they will be described individually at a later stage.

Furthermore, in the basic element 10 of the modular galley, interfaces 57, 58 are provided, which are used to supply items of equipment 44a, 44b, 45, 46, 47, 48 provided in the galley. Such supply can refer to the supply of electricity or water, to the transmission of data and information, to the disposal of waste water or to some other supply that may be beneficial in the context of items of equipment and devices in the widest sense, as may be provided in a galley, e.g. of an aircraft.

In the context of the present document the term "galley" refers to a facility in the widest sense, in particular for use on board an aircraft, which facility is suitable for supplying passengers or crew with food and beverages, with information material, gifts such as children's toys etc., as a display for advertising material or in some other way. In the context of the present document the term "galley" is in no way limited only to the provisioning or preparation of food.

Figure 2A:
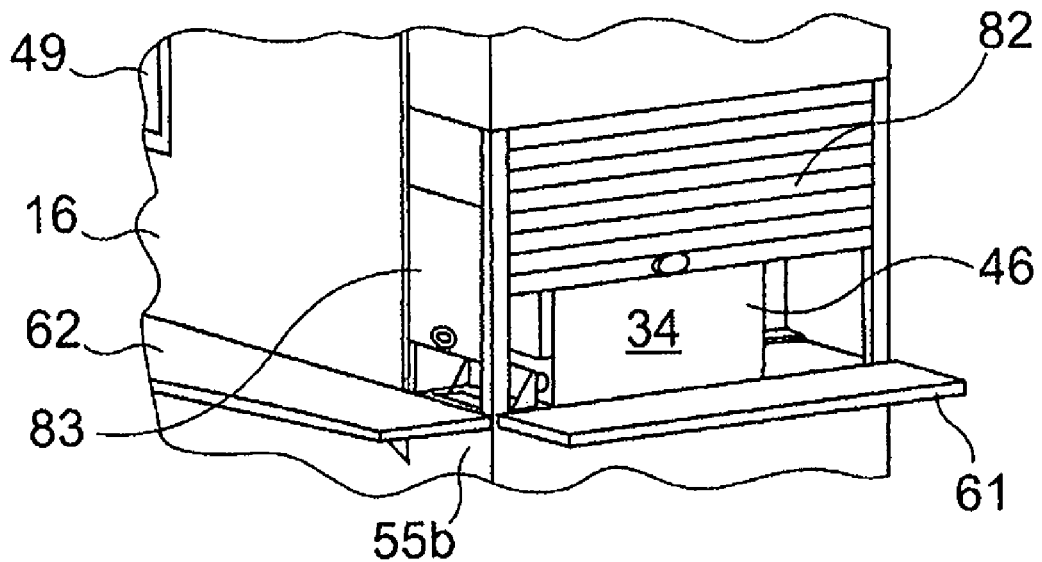
FIGS. 2a) and b) an area, provided for highly flexible use, of the exemplary embodiment shown in FIG. 1, of the galley according to the invention, with items of equipment or built-in devices provided according to various outfit variants.

The basic element 10 shown in FIG. 1 comprises a first type of usage area 31, 32, 33 that is provided for what in the context of this document is referred to as "standard usage" and that is provided for accommodating slide-in devices 41, 42, 43, for built-in devices or items of equipment 44a, 44b, 45 or for any other suitable use. These usage areas 31, 32, 33 provided for standard usage are closed off on at least two opposite sides, for example on sides 11, 13 of the usage area 31 or on sides 12, 14 of the usage area 32. Said usage areas 31, 32, 33 are used for accommodating slide-in devices 41, 42 or for any other use from the front, which is arranged across the aforesaid sides 11, 13 or 12, 14 etc., or for accommodating items of equipment 44a, 44b, 45 or built-in devices that can be operated from the front. On the face opposite the front, in other words on the rear, the usage areas 31, 32, 33 provided for standard usage can be closed off by a rear panel 16, for example by a rear panel 16 as shown in FIGS. 2a) and b), or on their face opposite the front said usage areas 31, 32, 33 can be provided to be entirely or partially open and accessible for accommodating slide-in devices, or for some other use from this side as well, or for accommodating items of equipment or built-in devices that can be operated from this side, as indicated by a device 49 in FIGS. 2a) and b).

Apart from said usage areas 31, 32, 33, which are provided for said "standard usage", the basic element 10 shown in FIGS. 1 and 2 comprises a further usage area 34 that is provided for "highly flexible use". The "standard usage" of the previously described usage areas 31, 32, 33 is a use in which, while being variable in the sense that according to requirements different slide-in devices 41, 42 or built-in devices or items of equipment 44a, 44b, 45 can be provided in a variable manner a selection, in all likelihood will however typically be maintained for a particular period of time or for a certain type of use. In contrast to the above, "highly flexible use" of the usage area 34 refers to any use that can quickly or for short periods and from case to case be changed without further ado in that, depending on the use at a given moment, built-in devices or items of equipment can, for example, be added, removed or exchanged. The area 34 provided for highly flexible use is open at a front and at least at a second side, arranged transverse to the front, i.e. the basic element 10 has no fixed panels provided on these sides of this usage area. The highly flexible usage area 34 of the basic element 10 shown in FIGS. 1 and 2 is arranged on one end of the basic element 10 and is open on three sides, namely on a narrow side of the base element 10 and on that part of the two longitudinal sides of the basic element 10, which part is taken up by the highly flexible usage area 34.

The area 34 provided for highly flexible usage is again provided with connection elements 52, 53, 54 for a mechanical connection of built-in devices 48 (FIG. 2b)) or items of equipment 46 (FIG. 2a)) or 48a, 47b (FIG. 18) and for the supply to said items of equipment 46, 47a, 47b with electricity or water or for the transmission of data and information or similar for a host of different uses.

In this exemplary embodiment said connection elements 52, 53, 54 for the mechanical connection of the built-in devices 48 or items of equipment 46, 47a, 47b, and the interfaces 57, 58 for the supply to the items of equipment 46, 47a, 47b are provided in a horizontal structural element 24, which forms the bottom of the highly flexible usage area 34, as is shown in more detail in FIGS. 3 to 7. The mechanical connection elements comprise paralelly extending attachment rails 52 provided in the bottom or in the horizontal structural element 24 that forms the bottom. These attachment rails 52 comprise a C-shaped cross section that is open towards the top, with connecting elements 53, 54 that are provided being insertable in the attachment rails 52 in the manner of sliding blocks, and being lockable, which connecting elements 53, 54 are slidable along the attachment rails 52, and on which connecting elements 53, 54 said built-in devices 48 or items of equipment 46, 47a, 47b can be attached at essentially any desired position in relation to the longitudinal direction of the rails 52. These connecting elements 53, 54, which are shown in more detail in FIGS. 8b) to 8d) and which can be inserted into the attachment rails 52, of which connecting 53, 54 three different embodiments are shown in FIGS. 8b) to 8d), can be connecting elements 53 that comprise internal screw threads used for screw fastening, as shown in FIGS. 8b) and c), or said connecting elements can be connecting elements 54 that comprise a threaded bolt with external screw thread provided for screw fastening, as shown in FIG. 8d).

Slide-in devices in the form of trolleys 41 or in the form of service slide-in devices 42 can be inserted into the usage areas 31, 32, 33 provided for standard usage, or built-in devices such as a coffee preparation device 44a, an oven 44b or a drink dispenser 45 can be in place, to name only a few of many possible examples.

Figure 2B:
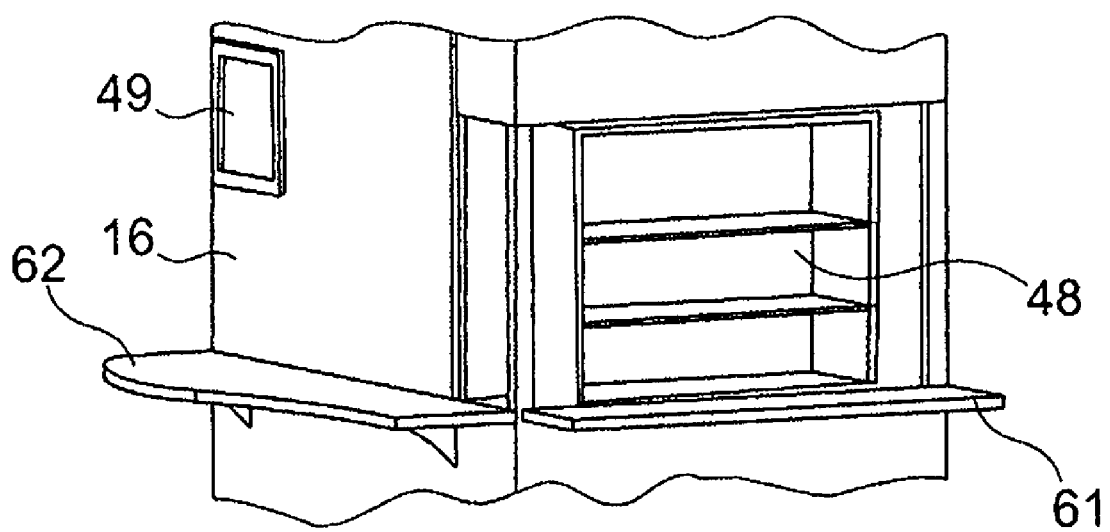
Figure 18:
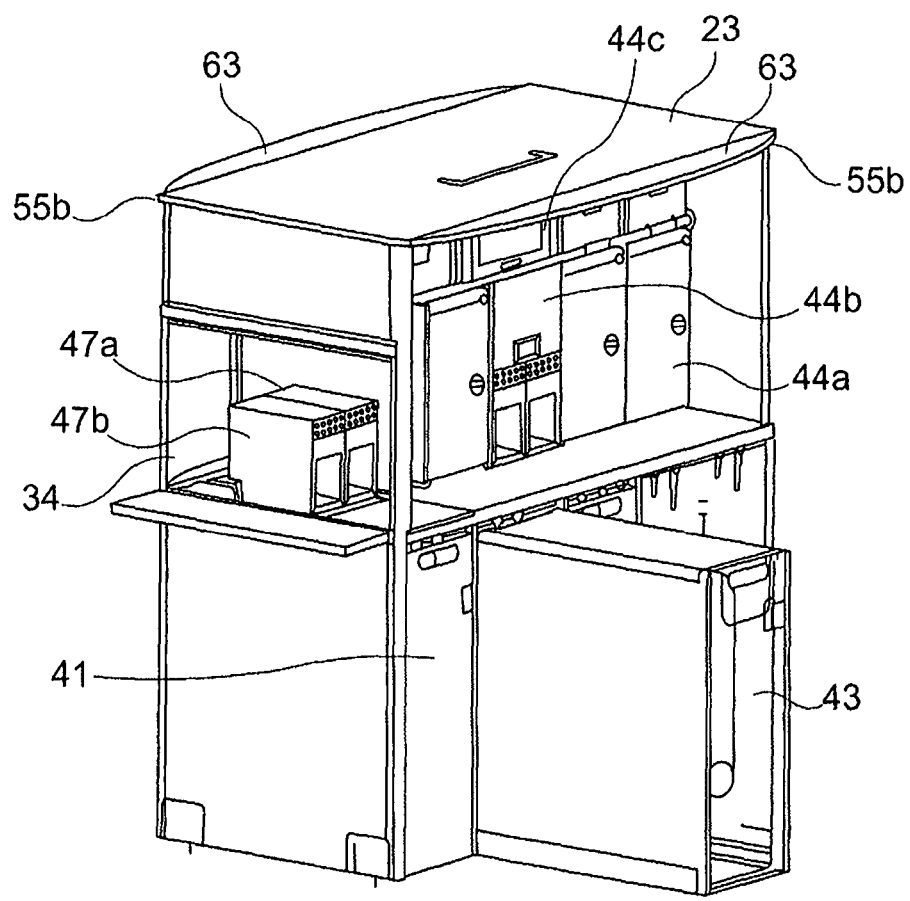
FIG. 18 a perspective overall view of a modular galley according to one exemplary embodiment of said modular galley.

In the area provided for highly flexible use 34, a larger device 46, as shown in FIG. 2a), can be inserted, for example a self-service unit, a wine cooler, an oven, an automatic drink dispenser, or two smaller devices can be inserted, for example two different automatic drink dispensers 47a, 47b, as shown in FIG. 18, or a glass cabinet module 48, as shown in FIG. 2b), to name only a few of many possible examples.

On the sides of the area provided for highly flexible use 34, roller shutters 82 or sliding doors 83 or similar closing elements can be provided, as shown in FIG. 2a).

Figure 3A:
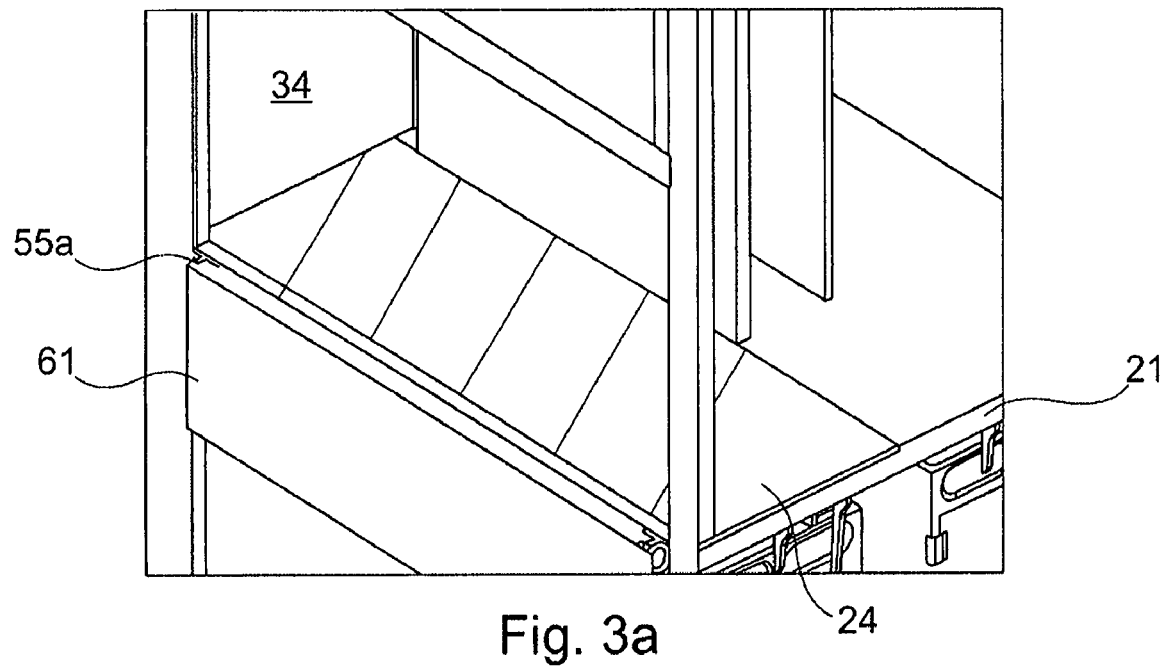
FIGS. 3a) and b) the same area, provided for highly flexible use, of the modular galley according to the exemplary embodiment shown in FIGS. 1 and 2, in another perspective without built-in devices.
Figure 3B:
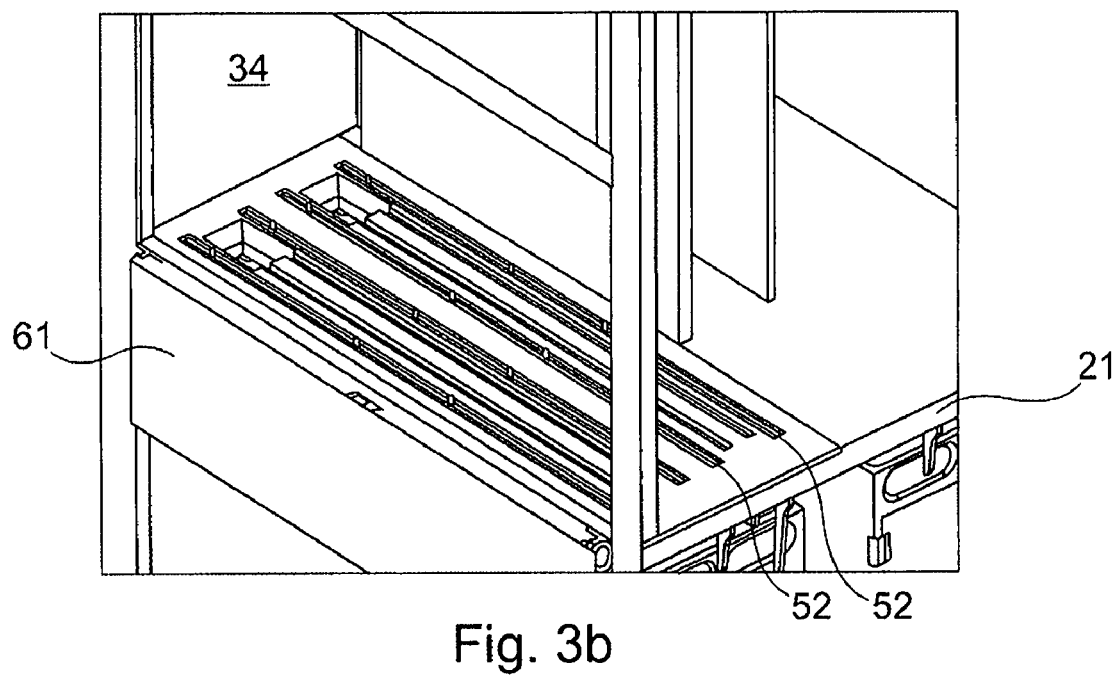

If the area 34 is only to be used as a free space without any particular built-in devices, as shown in FIG. 3a), then the structural element 24 that forms the bottom of said free space can be closed off by means of a cover panel 24a with which the attachment rails 52 and interfaces 57, 58 that are embedded in the bottom element 24 are covered.

Figure 4:
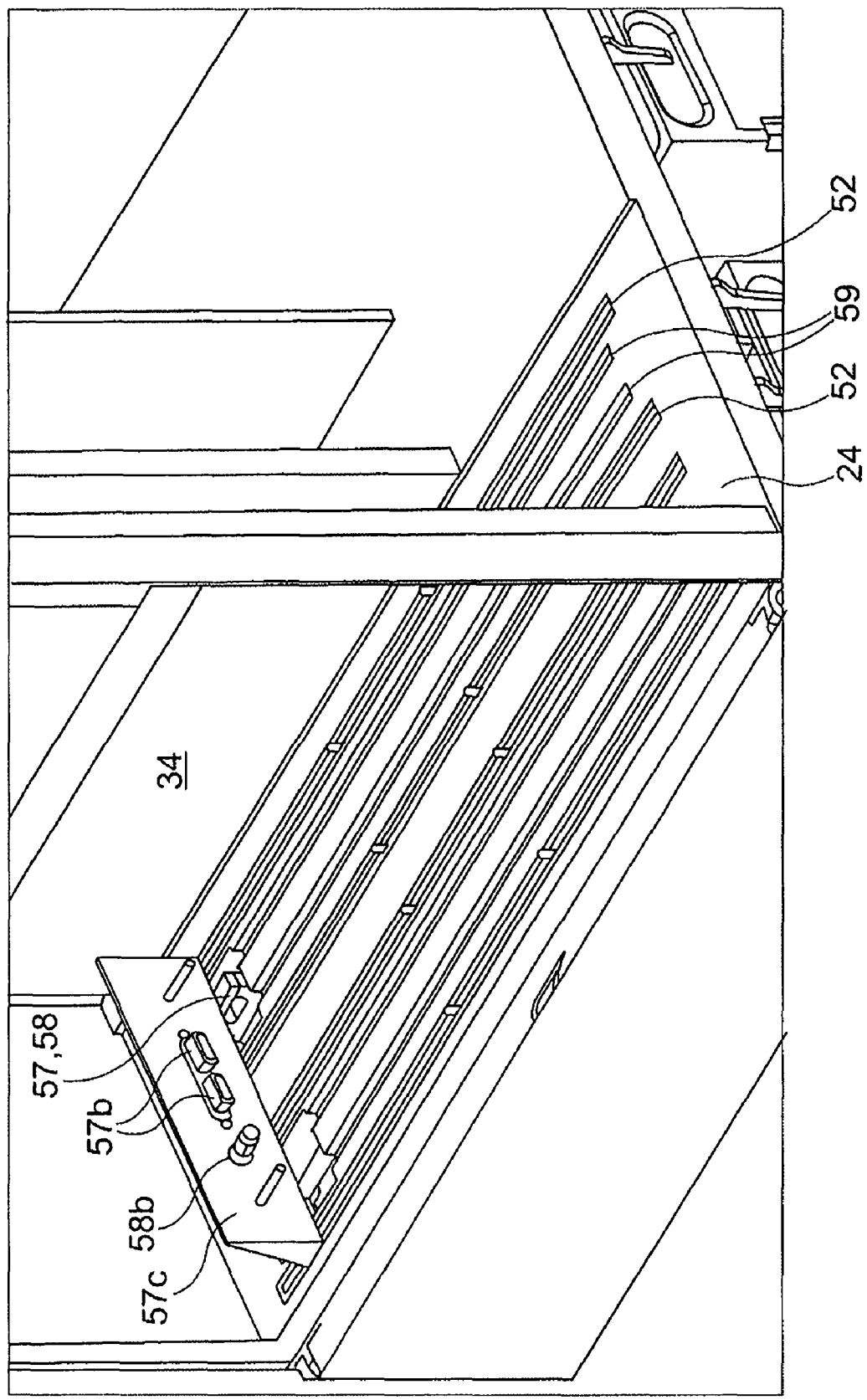
FIG. 4 an illustration similar to that of FIG. 3), of the area, provided for highly flexible use, of the galley, to explain various connection elements and interfaces.
Figure 6:
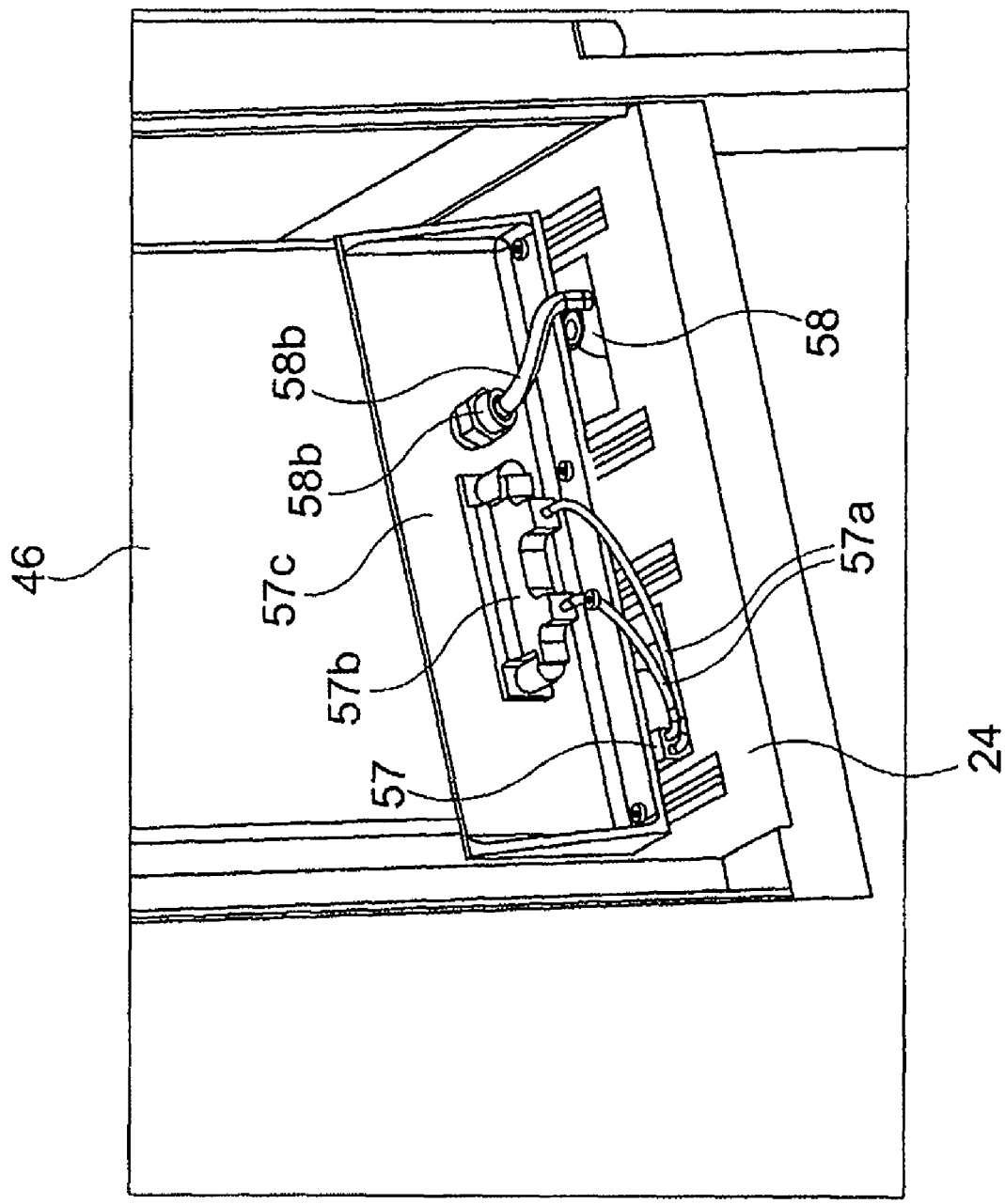
FIGS. 6, 7a) and b) further illustrations of the area, shown in FIG. 2, provided for highly flexible use, of the modular galley, wherein connection elements for the mechanical connection of built-in devices or items of equipment and interfaces for the supply of built-in devices according to one exemplary embodiment of the invention are shown in more detail.

The attachment rails 52 and the interfaces 57, 58 provided in the bottom element 24 are shown in more detail in FIG. 4. The attachment rails 57 extend parallel in relation to each other in the bottom element 24 of the area 34 provided for highly flexible use. In the exemplary embodiment presently shown and described, four such attachment rails are provided so as to extend parallel in relation to each other. Instead of this, the number or arrangement can also be different. Near one end of the attachment rails 52, also embedded in the bottom element 24 or arranged below it and accessible by a corresponding opening, the already explained interfaces 57 and 58 for the supply to devices are provided in the area 34. In the exemplary embodiment presently shown, a connecting block 57c is provided, which, as shown in FIG. 6, carries connector plugs or jacks 57b, 58b that are connected by way of respective lines 57a or 58a to the interfaces 57 or 58. The connecting block 57c is standardized; it is used for connecting a device 46, see FIGS. 5a) and b) and FIG. 6, for the supply to this device by way of the interface 57, 58.

Figure 7A:
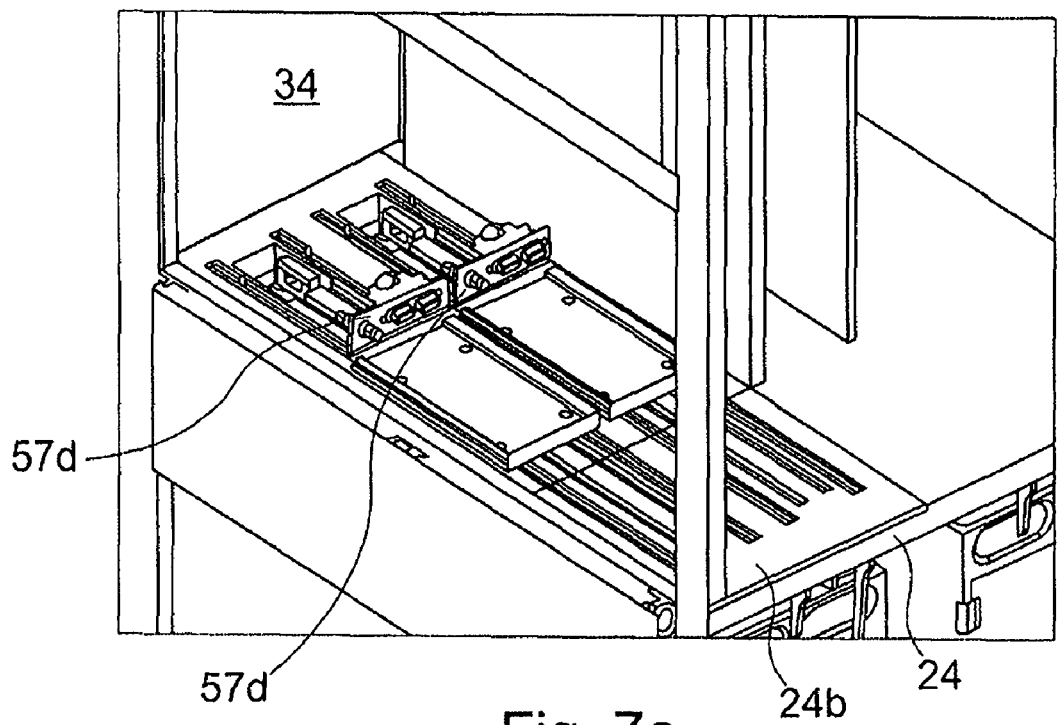
Figure 7B:
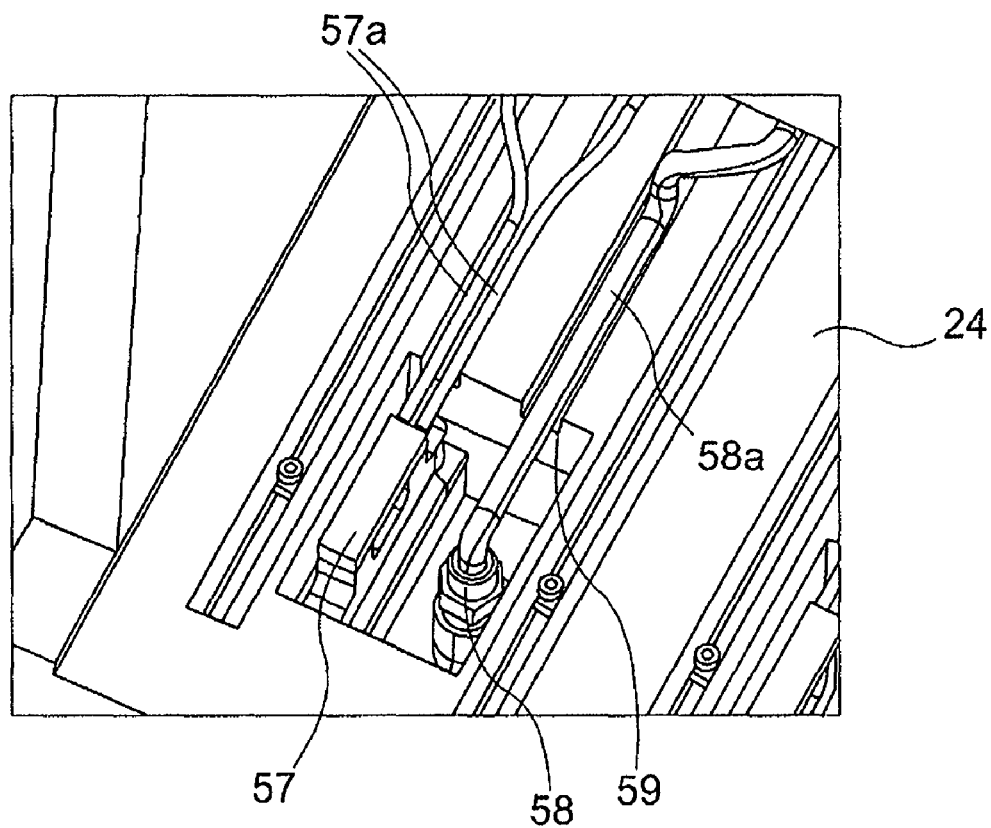

The connecting block 57c, as well as the device 46, is attached to the connecting rails 52 by way of the connecting elements 52, 53 shown in FIGS. 8b) to d), and can be positioned at a location along the rails 52, which location is more or less selectable at will. Instead of the only connecting block 57c shown in FIGS. 4 to 6, which connecting block 57c takes up the entire width across all four connecting rails 52, it is also possible to provide two connecting blocks 57d, each of half the length, with each of said connecting blocks extending only across two connecting rails 52, as shown in FIG. 7a).

In the bottom element 24, in each case between two connecting rails 52, grooves, slits or indentations 59 that extend parallel to said connecting rails 52 are provided, in which grooves, slits or indentations 59 the lines 57b, 58b can extend in the direction along the connecting rails 52 in order to establish a connection between the interfaces 57, 58 and the connecting blocks 57c or 57d when said connecting blocks 57c or 57d are arranged in relation to the interfaces 57, 58 so as to be offset in longitudinal direction of the connecting rails 52.

Figure 9:
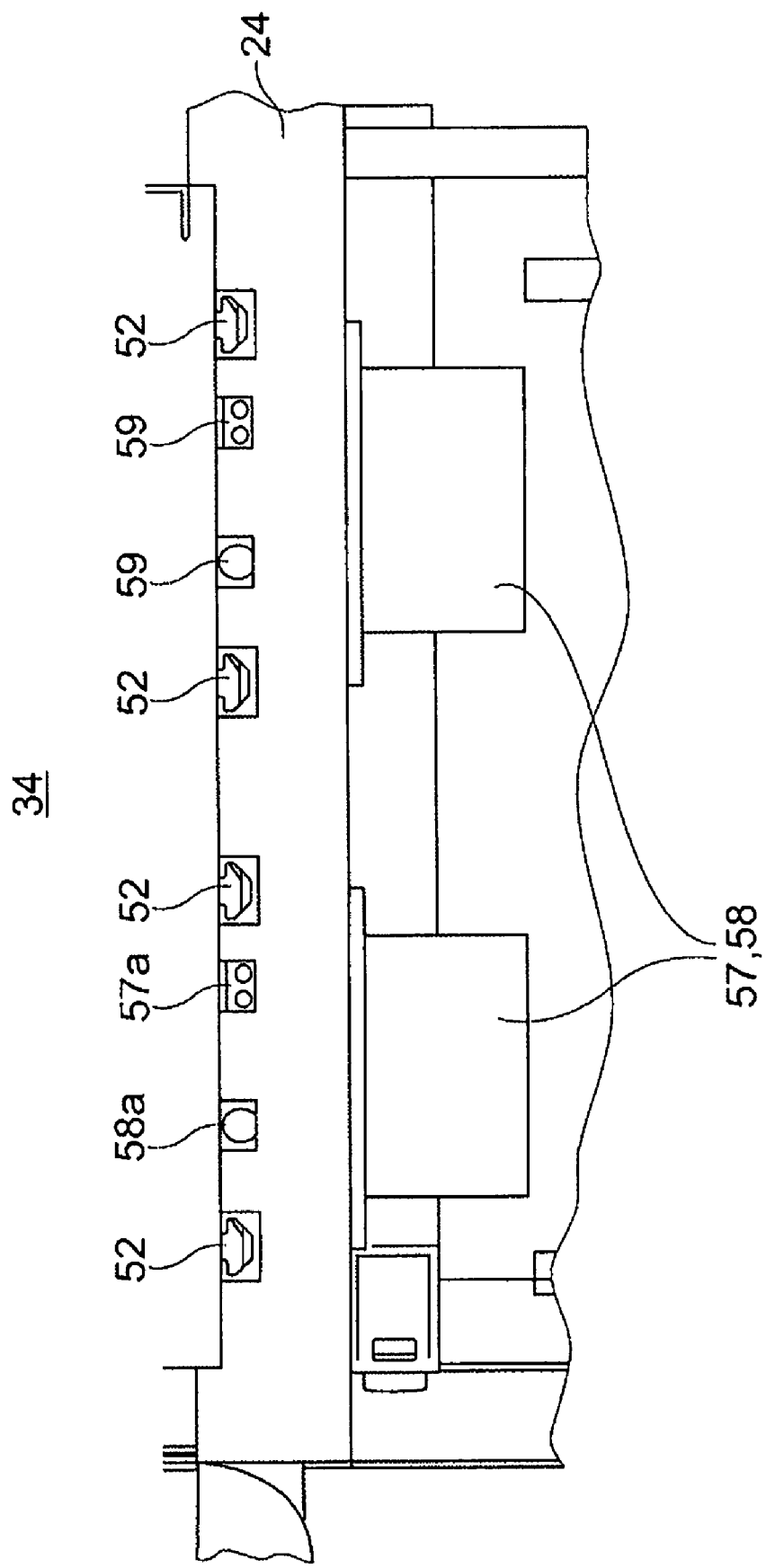
FIG. 9 a cross-sectional view of the connection elements and interfaces of the exemplary embodiment of the invention, which exemplary embodiment has already been shown in FIG. 4.

FIG. 9 shows a cross-sectional view of the structural element 24 that forms the bottom of the area 34 provided for highly flexible use, with the connecting rails 52 embedded therein, with the interfaces 57, 58 and the lines 57a, 58a that extend in between in the grooves 59.

The interfaces 57, 58 provided in all the usage areas 31, 32, 33, 34 of the modular galley are standardized interfaces. According to a preferred exemplary embodiment the electrical interfaces are standardized ARINC interfaces, as they will in future essentially be used exclusively in the area of galleys.

On the basic element 10 of the modular galley, on the outside, work surfaces or counter boards 61, 62 or extended-cover elements 63 can be provided, as shown in FIGS. 2a) and b) or in FIG. 18. By means of connection elements 55a, 55b, these work surfaces or counter boards 61, 62 or extended-cover elements 63 can either be arranged so as to be fixed, such as the counter board 62 (FIGS. 2a) and b)) and the extended-cover element 63 (FIG. 18), or they can be provided to be foldable-away downwards, as is the case with the work surface 61 (FIGS. 2a) and b) or 3a) and b)).

Figure 10B:
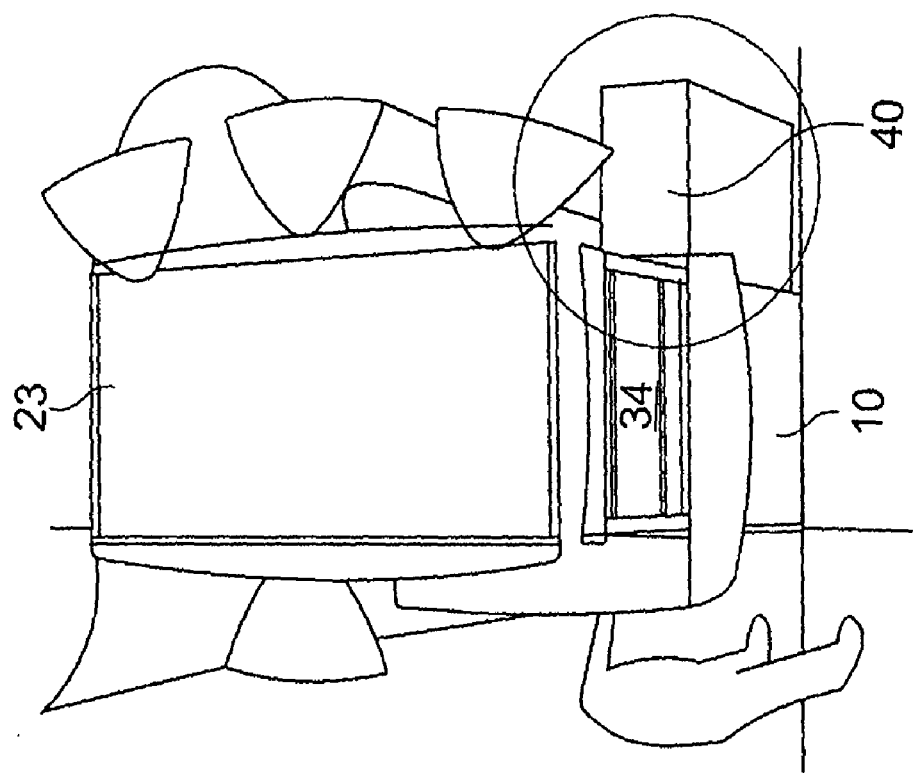
FIGS. 10a) and b) a diagrammatic top view or a perspective view of an enlargement of the modular galley by means of a laterally affixed container element according to a further exemplary embodiment of the invention.
Figure 10A:
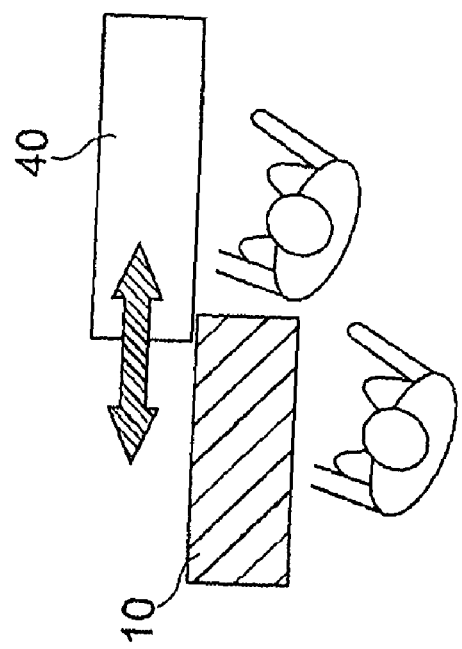

According to an exemplary embodiment, which is shown in FIGS. 10a) and b), a container 40 can be provided on the basic element 10, which container is rigid or, as is the case in the exemplary embodiment shown, slidable. As indicated in FIG. 10a) by an arrow, the container 40 can be displaced across in relation to the basic element 10, between a stowed-away position and a moved-out position. As shown in FIG. 10b) the container 40 can also be provided within the module 10 underneath the area 34 provided for highly flexible use, or of course also in some other location.

FIGS. 11 to 18 show different illustrations, views and details of slide-in devices 41, 43 that are provided in the bottom region of the basic element 10 of the modular galley. In the exemplary embodiment shown, these slide-in devices comprise a number, namely in the exemplary embodiment five, of trolleys 41 that are usual per se. These trolleys 41 can be individually moved out of the usage areas 31 (FIG. 1) provided for accommodating said trolleys 41, or stowed away in said usage areas 31. To prevent independent sliding, the trolleys 41 are lockable, by means of locking devices 92a, one of which is shown in FIGS. 14a) and b), both in their moved-in position and in their moved-out position, in relation to the basic element 10.

Figure 11A:
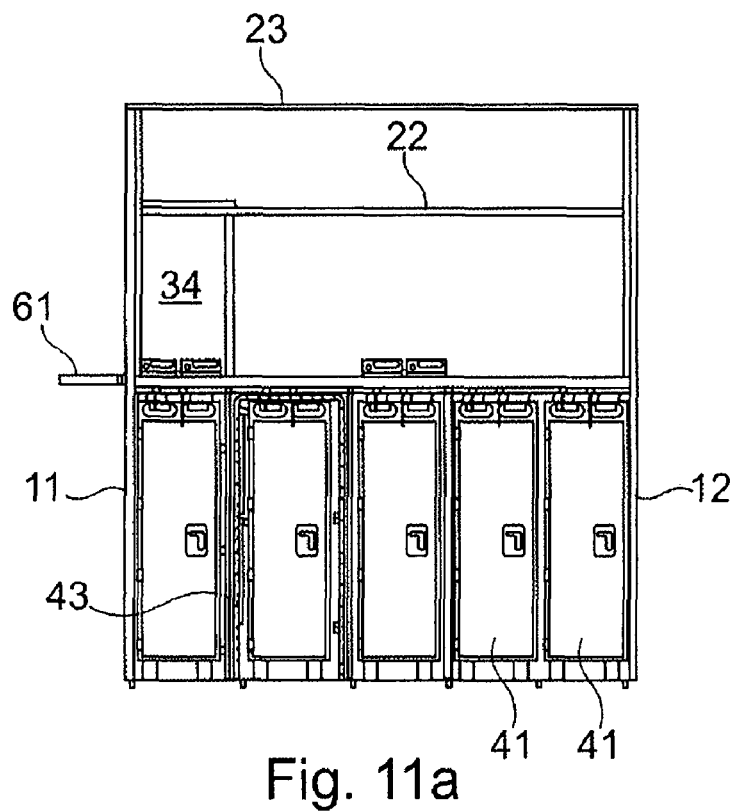
FIG. 11a) a frontal view of a modular galley according to the exemplary embodiment of the invention, shown in FIG. 1, for the purpose of explaining slide-in devices or trolleys in the bottom region of the modular galley, as well as FIGS. 11b) and c) enlarged partial views of these slide-in devices.
Figure 11B:
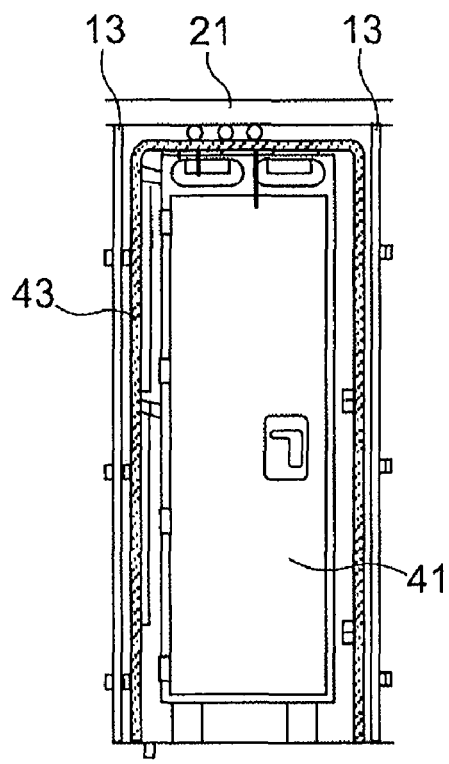
Figure 11C:
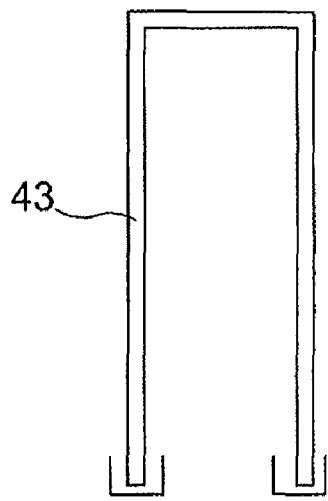
Figure 13:
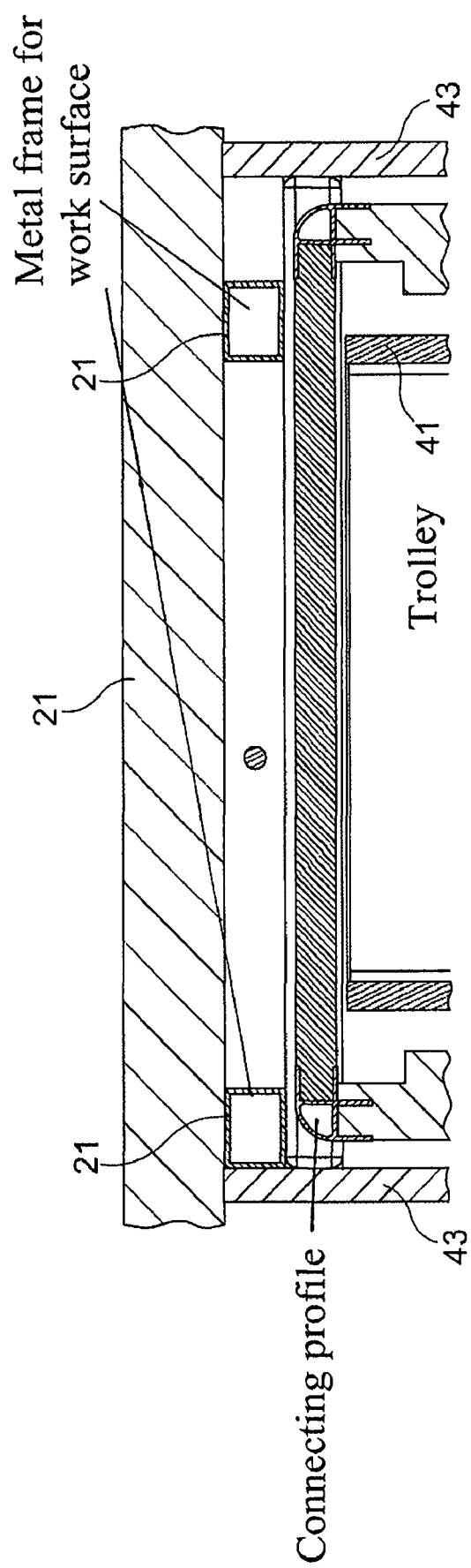
Figure 14A:
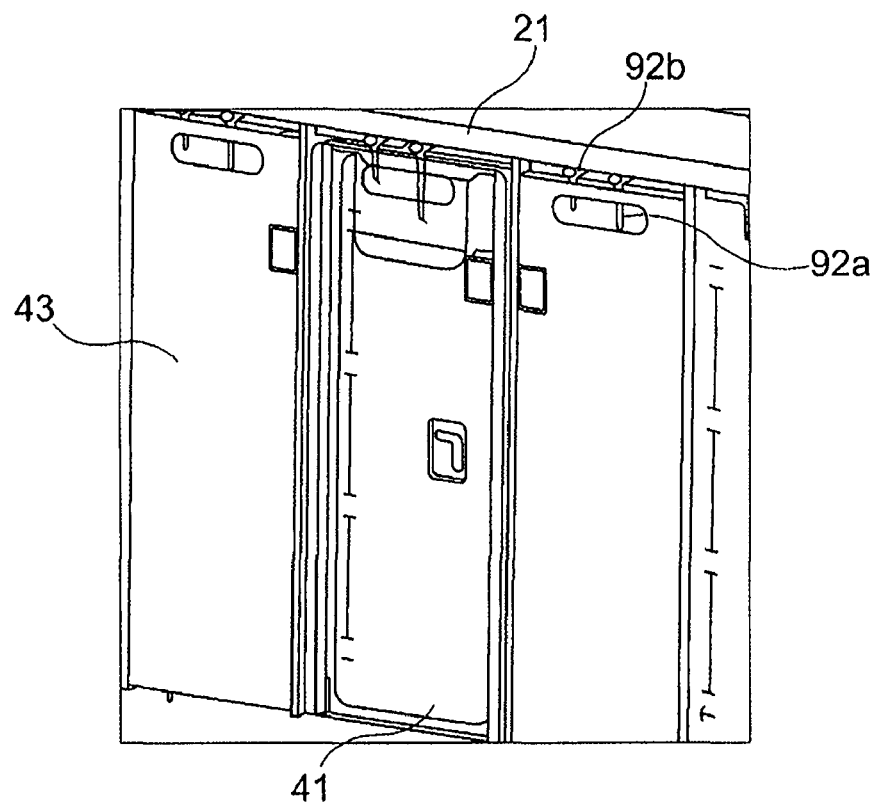
Figure 14B:
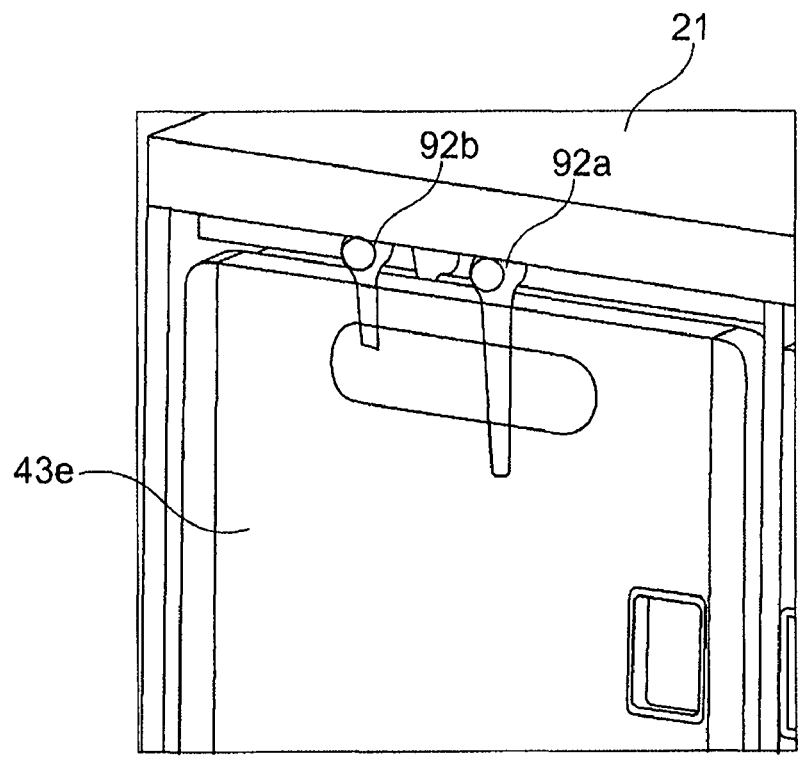
Figure 16B:
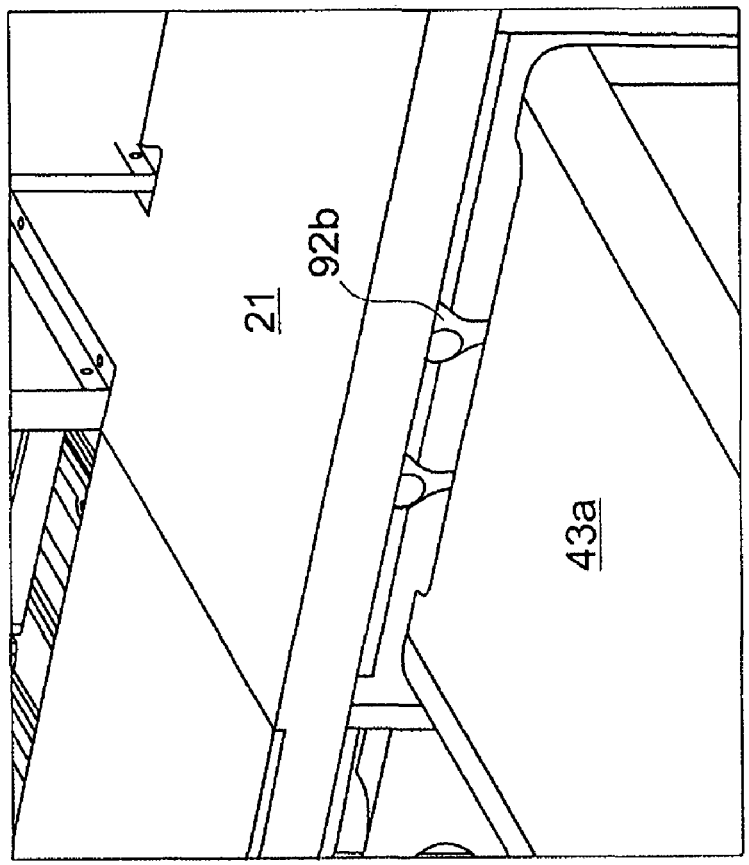
Figure 16A:
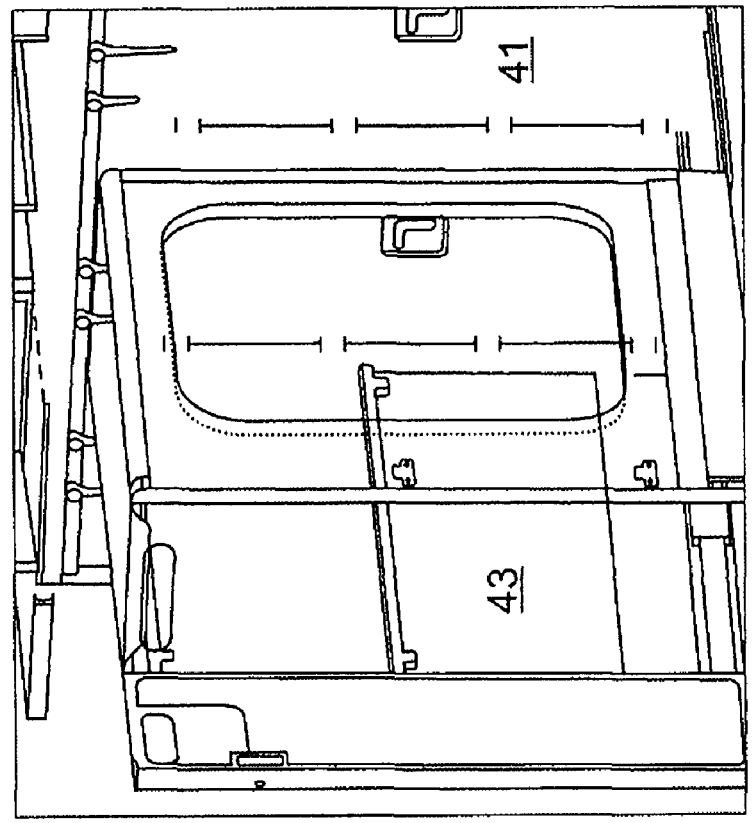

Furthermore, the slide-in devices of the exemplary embodiment shown comprise one or several bar- or storage elements 43, which in the case shown have a cross section of an inverted U, as shown in detail in FIG. 11c) and in FIG. 13, and which in each case are arranged so as to enclose one of the trolleys 41, wherein the long limbs of the "U"-shape form lateral parts 43b of the counter or work surface 43, which lateral parts 43b are arranged laterally beside the trolleys 41, and wherein the short limb, arranged at the top, of the inverted "U"-shape forms a work surface 43a that is arranged above the trolley 41. The counter or work surface 43 can be moved out and moved in relative to the basic element 10 and to the trolley 41 in the same direction as the trolley 41 can be moved out and moved in.

FIGS. 15b) and 16a) and b) show the bar- or storage element 43 in its moved-out position. On the front of the bar- or storage element 43 there is a door 43e that can be opened in order to reach the door 41e of the trolley 41, which door 41e is behind the door 43e. Both in its moved-in state and in its moved-out state the door 43e of the bar- or storage element, when said door is closed, closes off said bar- or storage element at the front. Within the bar- or storage element 43 on one of its lateral parts 43b intermediate bottoms 43d are provided, which in the moved-in state of the bar- or storage element 43 are vertically folded to said lateral part 43b, while in the pulled-out or moved-out state of the bar- or storage element 43 said intermediate bottoms 43d can be folded down horizontally so that they form a work surface, as shown in FIG. 15b. The bar- or storage element 43, too, comprises a locking device 92b, by means of which the position of said bar- or storage element 43 can be locked against any displacement, both in its moved-in state and in its moved-out state.

Instead of the inverted U-shaped cross section, as shown in FIGS. 11 to 18, the bar- or storage elements 43 that can be pulled out can also comprise a T-shaped or an inverted L-shaped cross section, wherein in that case one of the lateral limbs of the "T" or "L" forms a lateral part that is located laterally beside a trolley, while the short limb of the "T" or "L" then forms a work surface.

As shown in FIGS. 12a) and b), at the bottom of the lateral parts 43b of the bar- or storage element 43 that can be pulled out, in each instance a pull-out mechanism 43c is provided, which essentially is arranged within the width of the respective lateral part 43b so that no space is lost laterally. This pull-out mechanism is shown in an enlarged section view in FIG. 12b; it is formed by a telescopic pull-out mechanism that is known per se.

One of the lateral parts 43b of the bar- or storage element 43 comprises a section 43f, through which the interior of the bar- or storage element 43 is laterally accessible. Of course other embodiments are also possible, both in relation to the lateral opening or the lateral cutout section 43f, and in relation to the door 43e at the front of the bar- or storage element 43; wherein the door 43e can be left out, or two sections such as the sections 43f can be provided on each side of the bar- or storage element, or no section at all can be provided.

Figure 17:
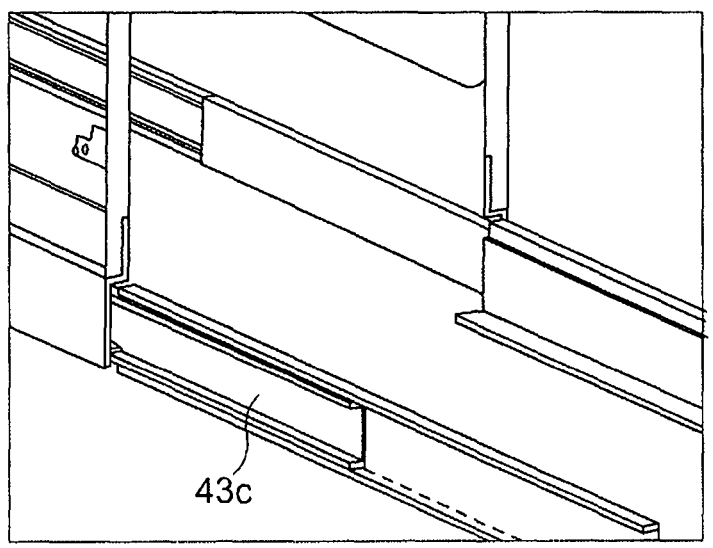
FIG. 17 a perspective detail view of a pull-out system of a slide-in device, as shown in FIGS. 11 to 16, according to one exemplary embodiment of the invention.

The pull-out mechanism shown in FIGS. 12a) and b) is again shown in FIG. 17 in a perspective view.

FIG. 18 shows an overall view of a completely built and equipped modular galley according to an exemplary embodiment of the invention, with a number of different devices, add-on devices and a bar- or storage element 43 in its moved-out state. The devices built into the areas 32, 33 provided for standard usage comprise a coffee preparation device 44a, an oven 44b, an espresso machine 45; while in the illustration shown the devices 47a, 47b in the area 34 provided for highly flexible use comprise, for example, two further automatic drink dispensers, for example for cold drinks. On the outside, added onto the basic element 10, there is a fold-down work surface 61 on the highly flexible usage area 34 along the narrow side of the basic element 10; a fixed counter board 62 along the rear longitudinal side of the basic element 10; and a small extended-cover element 63 on each longitudinal side of the basic element 10 at the top. The bar- and storage element can be moved in and moved out; in FIG. 18 it is shown in its moved-out state. Further items of equipment can, for example, be provided in the standard usage areas 33 provided in the upper area of the basic element 10, for example a microwave device 44c as indicated in FIG. 18.

LIST OF REFERENCE CHARACTERS

10 Basic element
11, 12, 13, 14, 15 Vertical structural elements
21, 22, 23 Horizontal structural elements
31, 32, 33 Standard usage areas
34 Highly flexible usage area
40 Container
41, 42, 43 Slide-in devices
44a, 44b, 45 Built-in devices
46, 47, 48 Built-in devices
51 Connection element
52, 56 Connecting rail
53, 54 Connecting element
57, 58 Interface
57a, 58a Connecting line
57b, 58b Connector plug
57c, 57d Connecting block
43b Lateral part
43d Intermediate bottom
43e Door
43f Section
43g Pull-out mechanism
61, 62, 63 Add-on part
92a, 92b Locking device

The invention claimed is:

1. A modular galley for an aircraft, comprising:
a plurality of vertical structural elements and a plurality of horizontal structural elements, the vertical and horizontal structural elements forming a plurality of usage areas for accommodating at least one interchangeable device, the interchangeable device being selected from the group consisting of add-on devices, slide-in devices, built-in devices and items of equipment, wherein the vertical and horizontal structural elements are fixed with respect to one another;
at least one connection element for the mechanical connection of the at least one interchangeable device; and
at least one interface for interacting with the at least one interchangeable device;
wherein the at least one connection element and the at least one interface are standardized such that the at least one interchangeable device can be affixed and interchanged at various usage areas;
wherein one of the plurality of horizontal structural elements comprises at least one of the at least one connection element and at least one of the at least one interface;
wherein the at least one interface comprises at least one interface selected from the group consisting of an interface for supplying electricity, an interface for supplying water, an interface for disposing of waste water, and an interface for transmitting data and information.

2. The galley of claim 1, wherein the plurality of vertical structural elements and plurality of horizontal structural elements comprise panel elements that delimit the usage areas.

3. The galley of claim 1, wherein the usage areas comprise at least one standard usage area that is closed on two sides that are opposite to each other and open at a front arranged transverse to the sides that are opposite to each other;
wherein at least one interchangeable device is provided and can be operated from the front.

4. The galley of claim 3, wherein the at least one standard usage area further comprises a rear panel which closes the side opposite to the front.

5. The galley of claim 3, wherein the at least one standard usage area is open and accessible at the side opposite to the front;
wherein at least one interchangeable device resides in the at least one standard usage area, and wherein the at least one interchangeable device can be operated from the side opposite to the front.

6. The galley of claim 1, further comprising at least one highly flexible usage area that is open at a front and at least at a side arranged transverse to the front;
wherein at least one connection element and at least one interface are provided in the highly flexible usage area.

7. The galley of claim 6, further comprising at least one end, wherein the at least one highly flexible usage area is arranged at the at least one end of the galley.

8. The galley of claim 7, wherein the at least one highly flexible usage area is open on three sides.

9. The galley of claim 6,
wherein one of the plurality of horizontal structural elements forms a bottom of the at least one highly flexible usage area and comprises the at least one connection element, and
wherein the at least one connection element comprises attachment rails that extend parallel and are provided in one of the plurality of horizontal structural elements that forms a bottom of the at least one highly flexible usage area.

10. The galley of claim 9, wherein the attachment rails comprise a cross-section that is C-shaped, L-shaped, T-shaped, or U-shaped,
wherein the cross-section comprises a top and is open towards the top;
the galley further comprising a plurality of lockable connecting elements that are insertable in the attachment rails and slidable along the attachment rails and which are configured such that at least one interchangeable device can be attached at any position along the longitudinal direction of the rails.

11. The galley of claim 10, wherein the connecting elements provided in the attachment rails comprise at least one of an aperture comprising internal screw threads and a threaded bolt with an external screw thread.

12. The galley of claim 9, wherein the at least one interface is arranged between the attachment rails.

13. The galley of claim 9, wherein one of the plurality of horizontal structural elements which forms the bottom of the at least one highly flexible usage area comprises at least one of grooves and slits which extend parallel to the attachment rails and are used to accommodate lines in an embedded manner, which lines lead from the at least one interface to at least one connection at the at least one device in the at least one highly flexible usage area.

14. The galley of claim 1, wherein each of the at least one interfaces are standardized interfaces.

15. The galley of claim 1, wherein the at least one interface comprises an electrical ARINC interface.

16. The galley of claim 1, wherein the add-on devices are affixed by connection elements to the outside of the galley and comprise at least one of work surfaces, counter boards, and extended-cover elements.

17. The galley of claim 1, wherein the at least one interchangeable device comprises a container that is rigidly or slidably affixed to the outside of the galley.

18. The galley of claim 1, wherein the at least one interchangeable device comprises at least one trolley.

19. The galley of claim 18, further comprising locking devices capable of locking the position of the trolleys in their moved-in state or in their moved-out state.

20. The galley of claim 1, wherein the at least one interchangeable device comprises at least one of bar-elements and storage elements, which elements can be pulled out of the galley to a moved-out state and pushed into the galley to a moved-in state.

21. The galley of claim 20, wherein each of the bar-elements or storage elements comprises an inverted U-shaped cross section, and is arranged to enclose at least one trolley, wherein the long limbs of the "U"-shape form lateral parts which can be moved out and moved in laterally beside the trolleys relative to the basic body of the galley, and wherein the short limb of the "U"-shape forms a work surface.

22. The galley of claim 21, wherein
each of the lateral parts of the bar-elements or storage elements comprises a bottom,
and wherein the bottom of each of the lateral parts of the bar-elements or storage elements comprises a pull-out mechanism which is integrated within the width of the lateral parts.

23. The galley of claim 20, wherein the bar-elements or storage elements have a T-shaped or an inverted L-shaped cross section, wherein the long limb of the "T"-shape or of the "L"-shape forms a lateral part which can be moved out of the galley and moved into the galley laterally beside the trolleys, and wherein the short limb of the "T"-shape or of the "L"-shape forms a work surface.

24. The galley of claim 20, wherein the bar-elements or storage elements comprise intermediate bottoms, which in a moved-in state of the elements are vertically folded to the lateral parts, and in a moved-out state of the elements can be folded down horizontally.

25. A modular galley for an aircraft, comprising:
a plurality of vertical structural elements and a plurality of horizontal structural elements, the vertical and horizontal structural elements forming a plurality of usage areas for accommodating at least one interchangeable device, the interchangeable device being selected from the group consisting of add-on devices, slide-in devices, built-in devices and items of equipment, wherein the vertical and horizontal structural elements are fixed with respect to one another;
at least one connection element for the mechanical connection of the at least one interchangeable device; and
at least one interface for interacting with the at least one interchangeable device;
wherein the at least one connection element and the at least one interface are standardized such that the at least one interchangeable device can be affixed and interchanged at various usage areas;
wherein the at least one interface comprises at least one interface selected from the group consisting of an interface for supplying electricity, an interface for supplying water, an interface for disposing of waste water, and an interface for transmitting data and information.

26. A modular galley for an aircraft, comprising:
a plurality of vertical structural elements and a plurality of horizontal structural elements, the vertical and horizontal structural elements forming a plurality of usage areas for accommodating at least one interchangeable device, the interchangeable device being selected from the group consisting of add-on devices, slide-in devices, built-in devices and items of equipment, wherein the vertical and horizontal structural elements are fixed with respect to one another;
at least one connection element for the mechanical connection of the at least one interchangeable device; and
at least one interface for interacting with the at least one interchangeable device;
wherein the at least one connection element and the at least one interface are standardized such that the at least one interchangeable device can be affixed and interchanged at various usage areas;
wherein the at least one interface comprises an electrical ARINC interface.

* * * * *

UNITED STATES PATENT AND TRADEMARK OFFICE
CERTIFICATE OF CORRECTION

Page 1 of 1

PATENT NO. : 7,780,114 B2
APPLICATION NO. : 11/804313
DATED : August 24, 2010
INVENTOR(S) : Oliver Doebertin et al.

It is certified that error appears in the above-identified patent and that said Letters Patent is hereby corrected as shown below:

On the cover of the patent item (75) replace "Constance" with --Konstanz--.

Signed and Sealed this
Fourth Day of October, 2011

David J. Kappos
*Director of the United States Patent and Trademark Office*